(12) United States Patent
Seida (10) Patent No.: US 8,811,720 B2
(45) Date of Patent: Aug. 19, 2014

(54) 3D VISUALIZATION OF LIGHT DETECTION AND RANGING DATA

(75) Inventor: Steven B. Seida, Wylie, TX (US)

(73) Assignee: Raytheon Company, Waltham, MA (US)

(*) Notice: Subject to any disclaimer, the term of this patent is extended or adjusted under 35 U.S.C. 154(b) by 319 days.

(21) Appl. No.: 13/180,576

(22) Filed: Jul. 12, 2011

(65) Prior Publication Data

US 2013/0016896 A1  Jan. 17, 2013

(51) Int. Cl.
  *G06K 9/00* (2006.01)
(52) U.S. Cl.
  CPC .......................... *G06K 9/00* (2013.01)
  USPC ........... 382/154; 382/103; 382/113; 382/128; 382/142
(58) Field of Classification Search
  CPC .... G01S 7/4811; G01B 11/002; G01B 11/24; G01C 15/002; A01K 11/008; A01K 29/00; A22B 5/007; A22B 5/201; G06T 15/20; G06T 17/05; G06T 19/003; G06T 15/00; G06T 2200/08; G06T 2207/10028; G06T 17/00; G05D 1/024
  USPC .................. 382/103, 113, 128, 142
  See application file for complete search history.

(56) References Cited

U.S. PATENT DOCUMENTS

| | | | |
|---|---|---|---|
| 5,172,155 A * | 12/1992 | Kosaka | ............................ 396/59 |
| 5,734,373 A | 3/1998 | Rosenberg et al. | |
| 6,028,593 A | 2/2000 | Rosenberg et al. | |
| 6,121,969 A | 9/2000 | Jain et al. | |
| 6,128,006 A | 10/2000 | Rosenberg et al. | |
| 6,147,674 A | 11/2000 | Rosenberg et al. | |
| 6,219,033 B1 | 4/2001 | Rosenberg et al. | |
| 6,737,591 B1 * | 5/2004 | Lapstun et al. | ............ 178/19.05 |
| 6,962,289 B2 | 11/2005 | Vatan et al. | |
| 7,070,277 B2 | 7/2006 | Trumbull | |
| 7,199,790 B2 | 4/2007 | Rosenberg et al. | |
| 7,239,760 B2 * | 7/2007 | Di Bernardo et al. | ........ 382/305 |
| 7,272,474 B1 | 9/2007 | Stentz et al. | |
| 7,470,195 B1 | 12/2008 | Baldwin, III et al. | |
| 7,725,253 B2 | 5/2010 | Foxlin | |
| 7,731,588 B2 | 6/2010 | Templeman | |
| 7,803,048 B2 | 9/2010 | Tilston et al. | |
| 7,831,089 B2 | 11/2010 | Ofek et al. | |
| 7,840,032 B2 | 11/2010 | Ofek | |
| 7,908,079 B1 | 3/2011 | Dabney et al. | |
| 7,917,289 B2 | 3/2011 | Feyereisen et al. | |
| 7,920,071 B2 | 4/2011 | Baillot | |
| 7,925,703 B2 | 4/2011 | Dinan et al. | |

(Continued)

*Primary Examiner* — Vu Le
*Assistant Examiner* — Aklilu Woldemariam
(74) *Attorney, Agent, or Firm* — Schwegman, Lundberg & Woessner, P.A.

(57) ABSTRACT

In accordance with particular embodiments, a method includes receiving LIDAR data associated with a geographic area and generating a three-dimensional image of the geographic area based on the LIDAR data. The method further includes presenting at least a first portion of the three-dimensional image to a user based on a camera at a first location. The first portion of the three-dimensional image is presented from a walking perspective. The method also includes navigating the three-dimensional image based on a first input received from the user. The first input is used to direct the camera to move along a path in the walking perspective based on the first input and the three-dimensional image. The method further includes presenting at least a second portion of the three-dimensional image to the user based on navigating the camera to a second location. The second portion of the three dimensional image presented from the walking perspective.

21 Claims, 5 Drawing Sheets

(56) References Cited

U.S. PATENT DOCUMENTS

| | | |
|---|---|---|
| 7,952,493 B2 | 5/2011 | Wyatt et al. |
| 8,340,726 B1* | 12/2012 | Fujisaki .................. 455/566 |
| 2002/0047895 A1* | 4/2002 | Bernardo et al. ............ 348/48 |
| 2003/0095098 A1* | 5/2003 | Paul et al. .................. 345/156 |
| 2003/0128865 A1* | 7/2003 | White ........................ 382/113 |
| 2005/0187677 A1* | 8/2005 | Walker ........................ 701/16 |
| 2007/0299604 A1* | 12/2007 | DiBernardo et al. ......... 701/207 |
| 2008/0084333 A1* | 4/2008 | Forrest et al. ............... 340/989 |
| 2008/0260237 A1* | 10/2008 | Savolainen et al. .......... 382/154 |
| 2008/0262911 A1* | 10/2008 | Altberg et al. ................ 705/14 |
| 2009/0303312 A1* | 12/2009 | Di Bernardo et al. ......... 348/36 |
| 2009/0319169 A1* | 12/2009 | DiBernardo et al. ........ 701/200 |
| 2010/0033783 A1* | 2/2010 | Klug et al. ..................... 359/9 |
| 2010/0211237 A1 | 8/2010 | Nichols et al. |
| 2010/0215250 A1* | 8/2010 | Zhu .............................. 382/154 |
| 2010/0217529 A1* | 8/2010 | Stroila et al. ................... 702/5 |
| 2010/0250030 A1 | 9/2010 | Nichols et al. |
| 2011/0282578 A1* | 11/2011 | Miksa et al. ................. 701/208 |

* cited by examiner

3D VISUALIZATION OF LIGHT DETECTION AND RANGING DATA

TECHNICAL FIELD

The present disclosure relates generally to methods and systems for 3D visualization of light detection and ranging data.

BACKGROUND

Light detection and ranging (LIDAR) can be used to create three-dimensional (3D) imagery of a geographic area. A LIDAR system includes a light source, such as a laser, that generates and directs pulses of light. The light pulses are reflected by the surface of various objects, such as the ground, a tree, or a building. A sensor in the LIDAR system detects the reflections. The relative elevation of the reflecting surface can be determined from the elapsed time from when the light pulse is generated and when it is detected. This cycle of pulse and detection may be repeated thousands of times per second. The reflected light pulses are used to create a 3D image of the scanned area. An operator may then use pan and zoom commands to change the camera orientation and see different portions of the scanned area.

SUMMARY

The teachings of the present disclosure relate to methods and systems for 3D visualization of light detection and ranging (LIDAR) data. For example, a method, in accordance with particular embodiments, includes receiving LIDAR data associated with a geographic area. The method also includes generating a 3D image of the geographic area based on the LIDAR data. The method further includes presenting at least a first portion of the three-dimensional image to a user based on a camera at a first location. The first portion of the three-dimensional image is presented from a walking perspective. The method also includes navigating the 3D image based on a first input received from the user. The first input is used to direct the camera to move along a path in the walking perspective based on the first input and the 3D image. The method further includes presenting at least a second portion of the 3D image to the user based on navigating the camera to a second location. The second portion of the three dimensional image presented from the walking perspective.

Technical advantages of particular embodiments may include allowing a user to explore a 3D image from a walking perspective. Accordingly, a user may be able to explore a 3D image as though they were walking through the corresponding geographic area. Another technical advantage of particular embodiments may include allowing the user to toggle between the walking perspective and a pan and zoom perspective. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
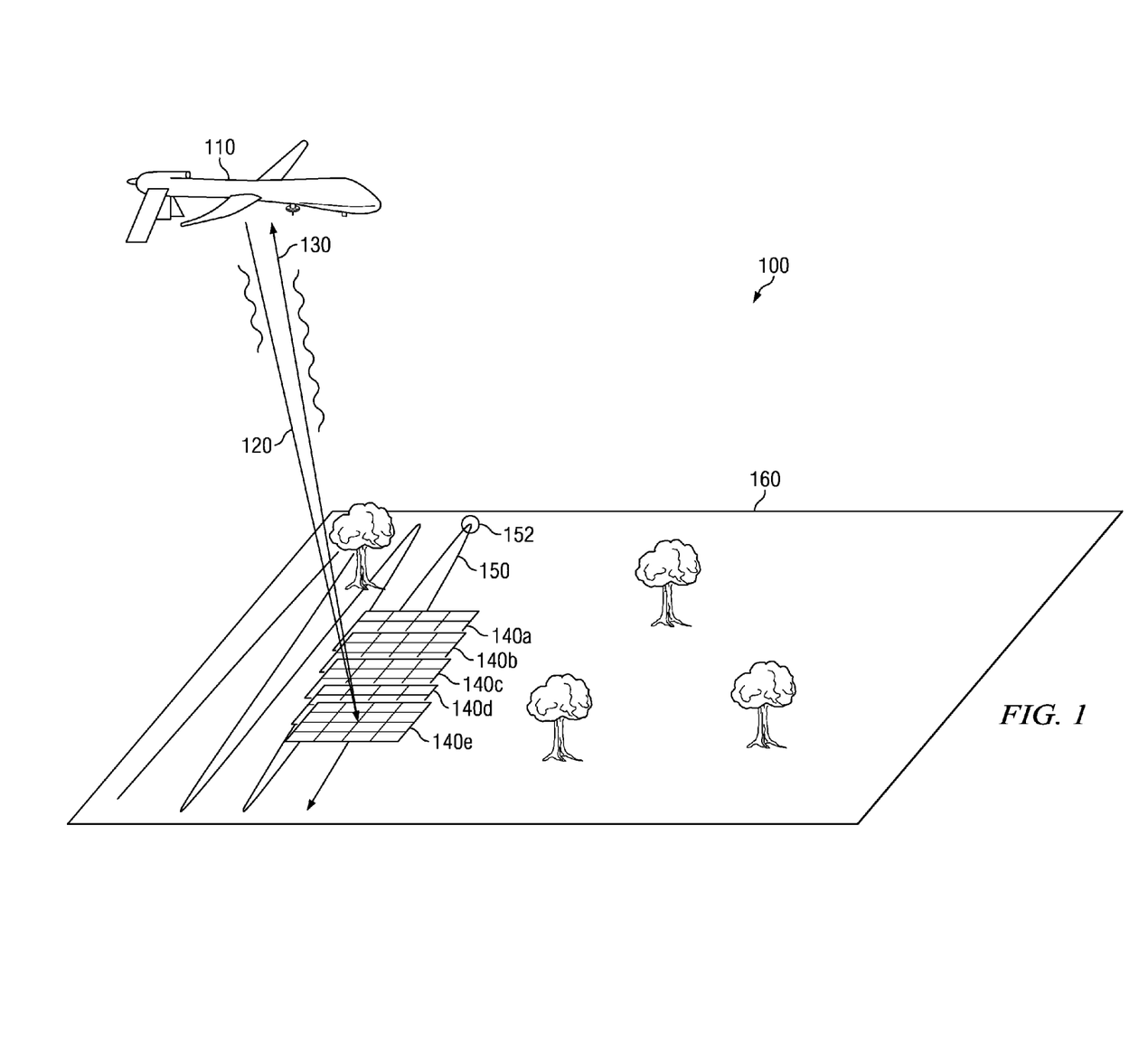
FIG. 1 illustrates a simplified diagram of a scenario in which LIDAR data is acquired, in accordance with a particular embodiment.

FIG. 1 illustrates a simplified diagram of a scenario in which LIDAR data is acquired, in accordance with a particular embodiment. In scenario 100, plane 110 is flying over, and scanning, geographic area 160. Plane 110 may be using a LIDAR system to scan geographic area 160. The LIDAR system may be configured to generate LIDAR data based on the detection of reflections 130 from light pulses 120. The LIDAR data may comprise a number of data points arranged within a 3D space. Each of the data points may be based on a different detected reflection 130. The LIDAR data may be used to generate a three-dimensional (3D) image (e.g., image 310 or 320 depicted in FIG. 3A or 3B, respectively) of geographic area 160.

As plane 110 flies over geographic area 160, the LIDAR system in plane 110 generates thousands of light pulses 120 per second. The light pulses are generated by a light source that is able to generate a focused beam of light along a known direction. The amount of focus of light pulse 120 (e.g., how narrow or wide) may vary depending on the type of LIDAR system used and/or the operational needs. The light source may scan the light pulses from side-to-side, constantly changing the direction of light pulse 120. In particular embodiments, there may be some overlap in the geographical area covered by subsequent light pulses. The scanning motion of the light source, combined with the movement of plane 110 may result in scan pattern 150. Scan pattern 150 may continue until it covers geographic area 160 and/or the scan is complete. This may provide the LIDAR system with millions of different reflections 120 for geographic area 160.

The rate at which pulses 120 are generated, and the size of the area covered by each pulse 120 (e.g., pulse area 140), are such that multiple reflections 130 may be detected for a given area. Thus, the data associated with a given area may be based on multiple reflections 130. For example, a particular area may include reflections 130 from pulse areas 140b and 140c. In addition to the reflections from consecutive light pulses, the same area may also include reflections 130 from one or more non-consecutive light pulses (e.g., light pulses generated before the light source changed directions, such as at point 152). The various angles with which pulse areas 140 are generated with respect to plane 110 may allow light pulses to be reflected from surfaces below other objects or surfaces (e.g., a carport). The multiplicity of reflections associated with an area may be averaged, scaled, or otherwise combined to determine the LIDAR data. In some embodiments, the LIDAR system may be arranged into voxels. A voxel may, in essence, be a three-dimensional pixel.

The area for which a particular reflection 130 is associated may depend on location, speed, and/or flight path of plane 110, the direction of the light source, and the time between when pulse 120 is generated and when the corresponding reflection 130 is detected. A given pulse 120 may create multiple reflections that may be detected at different times. For example, if there was a tree within pulse area 140*e*, reflections 130 from the top of the tree may be detected sooner than reflections 130 from the ground. The timing information may be used to determine the relative elevation of the object from which pulse 120 is reflected. In particular embodiments, the changing location of plane 110 and direction of the light source generating light pulses 120 may allow the LIDAR system to detect objects beneath other objects. For example, for a car parked under a tree, certain light pulses 120 may be reflected by the tree and certain light pulses 120 may be reflected by the car. This may allow the LIDAR system to "see" under certain objects.

From the detected reflections, a 3D image may be generated. In some embodiments, the 3D image may comprise a simple visualization of the reflections. For example, the 3D image may comprise individual points arranged in a 3D space according to the LIDAR data. In certain embodiments, the 3D image may comprise objects and/or surfaces arranged based on the reflections. For example, for a cluster of reflections that is determined to be a car, the 3D image may comprise an image of a car. As another example, for a cluster of reflections that is determined to be the ground, the 3D image may comprise a solid (though not necessarily flat) surface. In some embodiments, the 3D image may be created to comply with one or more constraints or parameters of a graphics engine (e.g., a first person shooter game engine) used to generate and/or navigate the 3D image.

Although a particular scenario is depicted and described with respect to FIG. 1, the LIDAR data may be generated in any of a variety of different scenarios. Moreover, the components used to generate the LIDAR data may vary from the components discussed above with respect to FIG. 1. Furthermore, the size and spacing of pulse areas 140 may vary depending on the scenario and/or operational needs.

Figure 2:
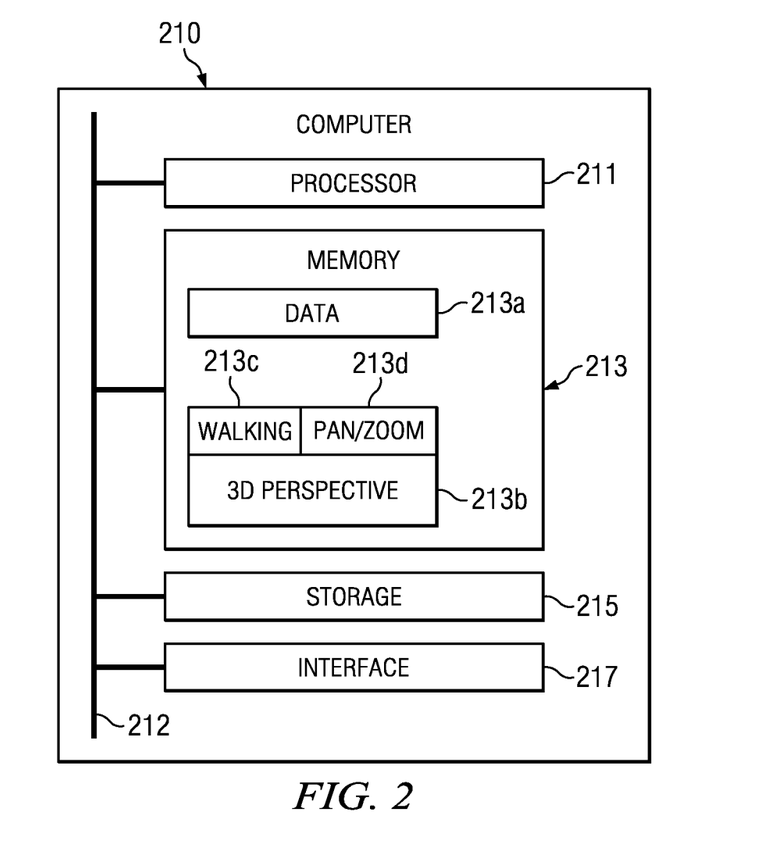
FIG. 2 illustrates a block diagram of a computer configured to visualize LIDAR data, in accordance with a particular embodiment.

FIG. 2 illustrates a block diagram of a computer configured to visualize LIDAR data, in accordance with a particular embodiment. The depicted computer 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of computer 210 may comprise any suitable physical form, configuration, number, type and/or layout. As an example, and not by way of limitation, computer 210 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 210 may include one or more computer systems; be unitary or distributed; span multiple locations; span multiple machines; or reside in a cloud, which may include one or more cloud components in one or more networks. In one embodiment, computer 210 may be a component of, integrated in, or coupled to, a LIDAR system.

Where appropriate, computer 210 may perform without substantial spatial or temporal limitation one or more steps of one or more methods described or illustrated herein. As an example, and not by way of limitation, computer 210 may perform in real time or in batch mode one or more steps of one or more methods described or illustrated herein. One or more computers may perform at different times or at different locations one or more steps of one or more methods described or illustrated herein, where appropriate.

In the depicted embodiment, computer 210 may include processor 211, memory 213, storage 215, interface 217, and bus 212. These components may work together to present a 3D image in which a user is able to navigate around the 3D image from either a walking perspective or a pan and zoom perspective. Although a particular computer is depicted as having a particular number of particular components in a particular arrangement, this disclosure contemplates any suitable computer having any suitable number of any suitable components in any suitable arrangement. For simplicity, only the components of computer 210 are depicted. Other devices, such as the light source and sensors used in generating the LIDAR data, may be coupled to computer 210 (e.g., via interface 217) but are not depicted herein.

Processor 211 may be a microprocessor, controller, or any other suitable computing device, resource, or combination of hardware, software and/or encoded logic operable to provide, either alone or in conjunction with other components (e.g., memory 213), the ability to present a 3D image which a user is able to navigate from a walking perspective and/or a pan and zoom perspective. This functionality may further include providing various other features discussed herein. For example, processor 211 may identify the boundaries of one or more objects, such as the ground or a building. This information may be used when navigating the 3D image from the walking perspective (e.g., preventing a camera from walking through a building).

In particular embodiments, processor 211 may include hardware for executing instructions, such as those making up a computer program. As an example, and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215. The instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. Memory 213 may store any suitable data or information utilized by computer 210, including software embedded in a computer readable medium, and/or encoded logic incorporated in hardware or otherwise stored (e.g., firmware). In particular embodiments, memory 213 may include main memory for storing instructions for processor 211 to execute or data upon which processor 211 may operate. For example, memory 213 may include 3D perspective logic 213b for generating a 3D image and allowing the user to interact and/or navigate through the 3D image. In some embodiments, 3D perspective logic 213b may be based on a Java language library (e.g., JMonkey Engine, Java 3D, etc.) configured to render the LIDAR data for a two-dimensional view point. In certain embodiments, 3D perspective logic 213b may comprise, or interface with, walking perspective logic 213c and pan and zoom logic 213d. Walking perspective logic 213c and pan and zoom logic 213d may provide logic to visualize the 3D LIDAR data from two different perspectives and may allow the user to interact with the 3D image according to two different schemes. In some embodiments, walking perspective logic 213c may be based on, or comprise, a first-person shooter game engine (e.g., Unreal engine, JMonkey Engine, etc.). In some embodiments, memory 213 may further comprise data 213a which may store any data used in any calculations and/or any other data used by processor 211.

In particular embodiments, one or more memory management units (MMUs) may reside between processor 211 and memory 213 and facilitate accesses to memory 213 requested by processor 211. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate.

In some embodiments, computer 210 may, by way of example and not by way of limitation, load instructions from storage 215 or another source (such as, for example, another computer system) to memory 213. Processor 211 may then load the instructions from memory 213 to an internal register or an internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

Bus 212 may include any combination of hardware, software embedded in a computer readable medium, and/or encoded logic incorporated in hardware or otherwise stored (e.g., firmware) to couple components of computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

In particular embodiments, storage 215 may include mass storage for data or instructions. As an example and not by way of limitation, storage 215 may include an HDD, a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer 210, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include one or more interfaces for one or more I/O devices. One or more of these I/O devices may enable communication between a person and computer 210. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. In certain embodiments, one interface of interface 217 may receive user input manipulating the view of a 3D image presented on a display device via a second interface of interface 217. An I/O device may include one or more sensors. Particular embodiments may include any suitable type and/or number of I/O devices and any suitable type and/or number of interfaces 217 for them. Where appropriate, interface 217 may include one or more devices or encoded software drivers enabling processor 211 to drive one or more of these I/O devices. Interface 217 may include one or more interfaces 217, where appropriate.

In certain embodiments, interface 217 may comprise any combination of hardware, encoded software, or a combination of hardware and encoded software configured to receive LIDAR data. In some embodiments, the data may be received via interface 217 from a remote LIDAR system. For example, the LIDAR system may be on a plane, while computer 210 may be on the ground. In some embodiments, the data may be received via interface 217 from a local LIDAR system. For example, computer 210 may share one or more components with, or be physically connected to, the LIDAR system. As another example, in some scenarios both computer system 210 and the LIDAR system may be on a plane (e.g., plane 110).

Herein, reference to a computer-readable storage medium encompasses one or more tangible, non-transitory, computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Computer 210 may be coupled to a network. The term "network" should be interpreted as generally defining any network or combination of networks capable of transmitting signals, data, and/or messages, including, but not limited to, signals, file transfer protocols, data or messages transmitted through WebPages, e-mail, text chat, voice over IP (VoIP), and instant messaging. Generally, the network may provide for the communication of packets, cells, frames, or other portions of information (generally referred to as packets herein) between the various components. In some embodiments, the LIDAR data may be communicated from the LIDAR system to computer 210 via the network.

The following example may help illustrate at least one way in which the components of computer 210 may work together to allow a user to interact with a 3D image generated from LIDAR data. In this example, processor 211 may load, or otherwise execute, 3D perspective logic 213a and/or one of walking perspective logic 213c or pan and zoom perspective logic 213d. The loaded logic may then be used along with interface 217 to receive and process the LIDAR data for a given geographic area. The LIDAR data may be communicated from interface 217 to processor 211 via bus 212. Processor 211 may then use the loaded logic and LIDAR data to generate a 3D image of the given geographic area. In certain embodiments, 3D perspective logic 213b may be configured to interpolate or drape surfaces over the received LIDAR data. This may give the presented 3D image a more solid, realistic, and/or accurate image than simply presenting clusters of points generated from the LIDAR data.

Figure 3A:
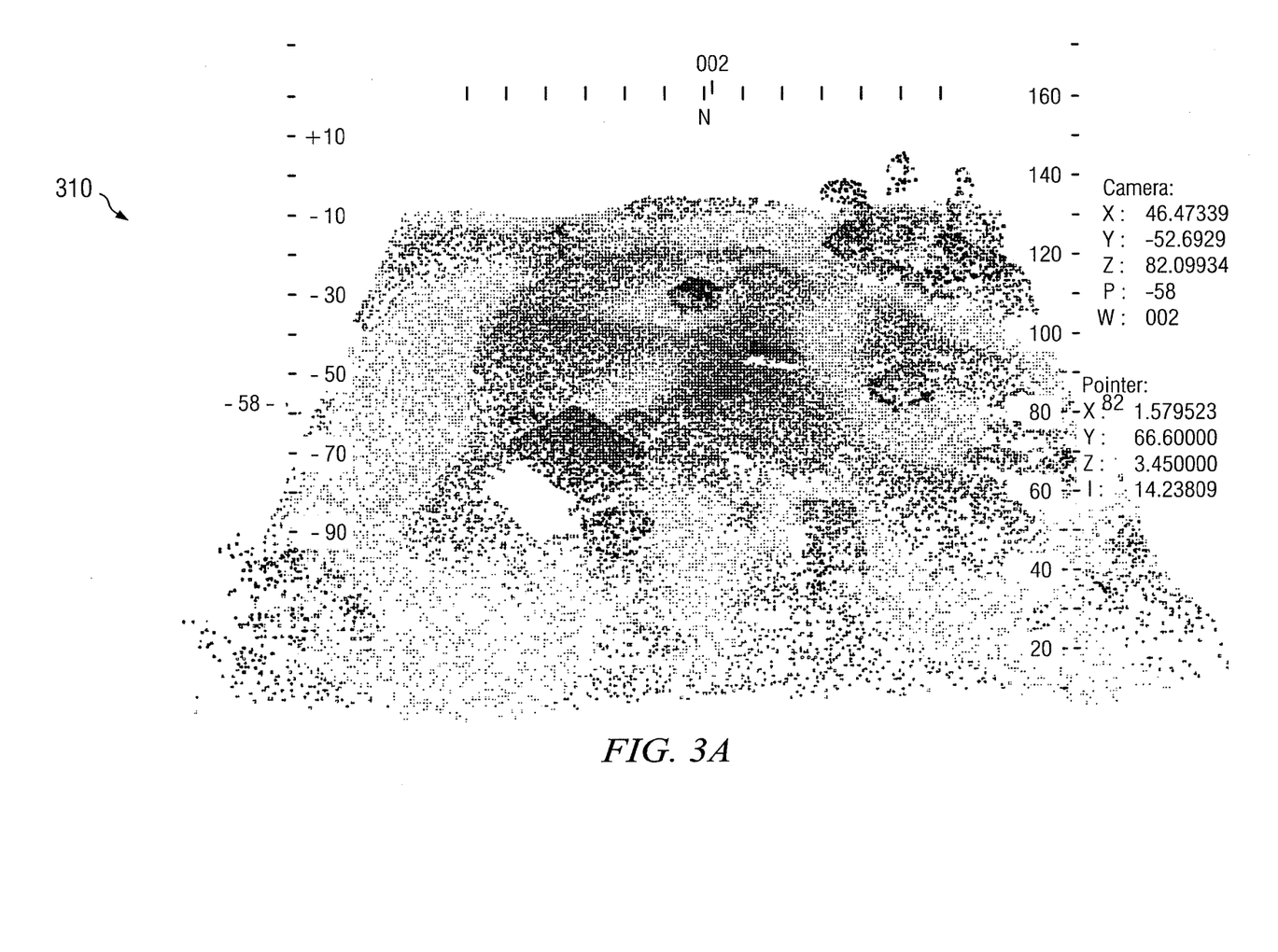
FIG. 3A illustrates a sample visualization of LIDAR data from a pan and zoom perspective, in accordance with a particular embodiment.
Figure 3B:
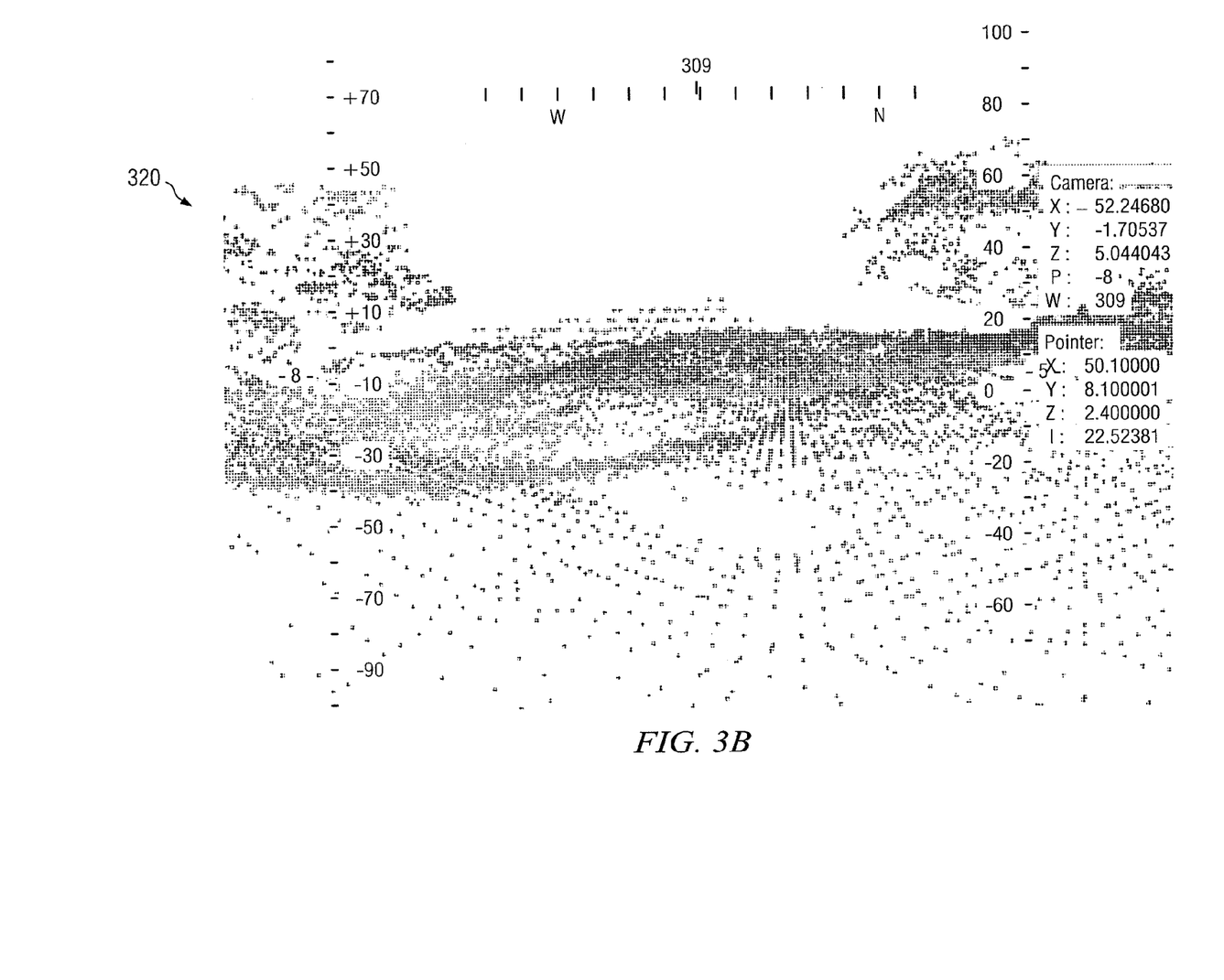
FIG. 3B illustrates a sample visualization of LIDAR data from a walking perspective, in accordance with a particular embodiment.

The perspective with which the 3D image is presented may be based on the perspective selected by a user. The selection may be received via interface 217 (e.g., a mouse and keyboard connected to computer 210 via a USB interface). If a walking perspective is selected by a user, walking perspective logic 213c may be loaded and the 3D image may be visualized from a walking perspective. For example, 3D image 320 is based on a walking perspective. The walking perspective may present the 3D image from a camera positioned and/or arranged to correspond to a user standing in the given geographic area. The user may then provide input which causes the camera to walk along the geographic area, presenting different areas of the given geographic area as the camera moves. In some embodiments, the camera may remain at a fixed height above the surface below the camera (e.g., the ground). Thus, the elevation of the camera may follow the contours of the geographic area. For example, as the camera walks up a hill, the elevation of the camera may increase. In some situations, the camera may move in one direction, while facing another direction. For example, the camera may face north while it moves east. This may be referred to as strafing. In some embodiments, a user may use a mouse and keyboard to enter walking perspective commands. In certain embodiments, a user may use a gamepad to enter walking perspective commands. In particular embodiments, walking perspective logic 213c may be configured to detect collisions between the camera (and, in some embodiments, the space below the camera) and objects within the 3D image (e.g., a tree). In some embodiments, data points for additional tactile-feedback (e.g., to simulate a weapon firing) may also be included.

In some embodiments, processor 211 may execute a portion of logic within walking perspective logic 213c to identify, within the LIDAR data, the ground and determine its contours and elevation changes. This may allow the camera to rise and fall with the contours of the ground of the 3D image, similar to how a user would rise and fall when walking around the given geographic area. In some embodiments, the logic may also be executed by processor 211 to identify objects, such as trees or buildings, that rise from the ground. Once the objects have been identified, collision detection may be used to prevent a user from walking through the object. Collision detection may be part of walking perspective logic 213c. In some scenarios, the user may be able to walk underneath the object. For example, a user may be allowed to walk under the leaves of a tree or an overhang of a cliff. In some embodiments, the ability to walk under objects may be based on the reflections received by the LIDAR system. For example, if the LIDAR system receives reflections from two vertically separated horizontal parallel surfaces, processor 211 may determine that the upper surface is an overhang and that the camera can pass under the overhang; if the LIDAR system receives reflections from a vertical surface between the two horizontal surfaces, processor 211 may determine that the upper surface is the roof of a building with walls and that the camera cannot pass through the walls of the building. In some embodiments, the camera may be allowed to pass through the walls of identified objects. In some embodiments, when a user reaches, for example, the side of a building, the camera may jump to the top of the building.

If a pan and zoom perspective is selected by a user, pan and zoom logic 213*d* may be loaded and the 3D image may be visualized from a pan and zoom perspective. For example, 3D image 310 is based on a pan and zoom perspective. The pan and zoom perspective may allow a user to move around the 3D image by panning and/or zooming around the displayed image. The panning operations may reposition the camera within the visualized 3D image. As the user repositions the camera, the portion of the given geographic area that is presented to the user may change. The zooming operation may increase or decrease the amount of the geographic area that is being displayed. For example, as a user zooms in to enlarge a particular object, the object will consume more of the viewing area of the user's display device while decreasing the amount of the total geographic area that is displayed. In certain embodiments, a user may use a mouse and keyboard to enter pan and zoom inputs.

Switching between a walking perspective and a pan and zoom perspective, may change the input commands that are entered by a user and how the 3D image is presented. For example, if a user moves a mouse while in the walking perspective, the direction in which the camera is facing may change based on the movement of the mouse; if a user moves the mouse while in the pan and zoom perspective, a pointer may move within the presented image, but the image itself may remain unchanged.

In some embodiments, the LIDAR data received via interface 217 may comprise a plurality of points arranged in a 3D space. Each of these points may represent one or more light pulse reflections detected by the LIDAR system. In certain embodiments, processor 211 may execute one or more instructions in 3D perspective logic 213*b* that create surfaces based on the received LIDAR data. Creating the surfaces may allow objects to be more easily recognizable. In some embodiments, the points may be represented as platelets, or a combination of platelets. This may help visualize small items, such as elevated wires (e.g., powerlines). Other shapes may be used in other embodiments.

Thus far, several different embodiments and features have been presented. Particular embodiments may combine one or more of these features depending on operational needs and/or component limitations. This may allow for great adaptability of computer 210 to the needs of various organizations and users. Some embodiments may include additional or different features. In particular embodiments, the functionality of computer 210 may be provided by additional or different devices.

Figure 4:
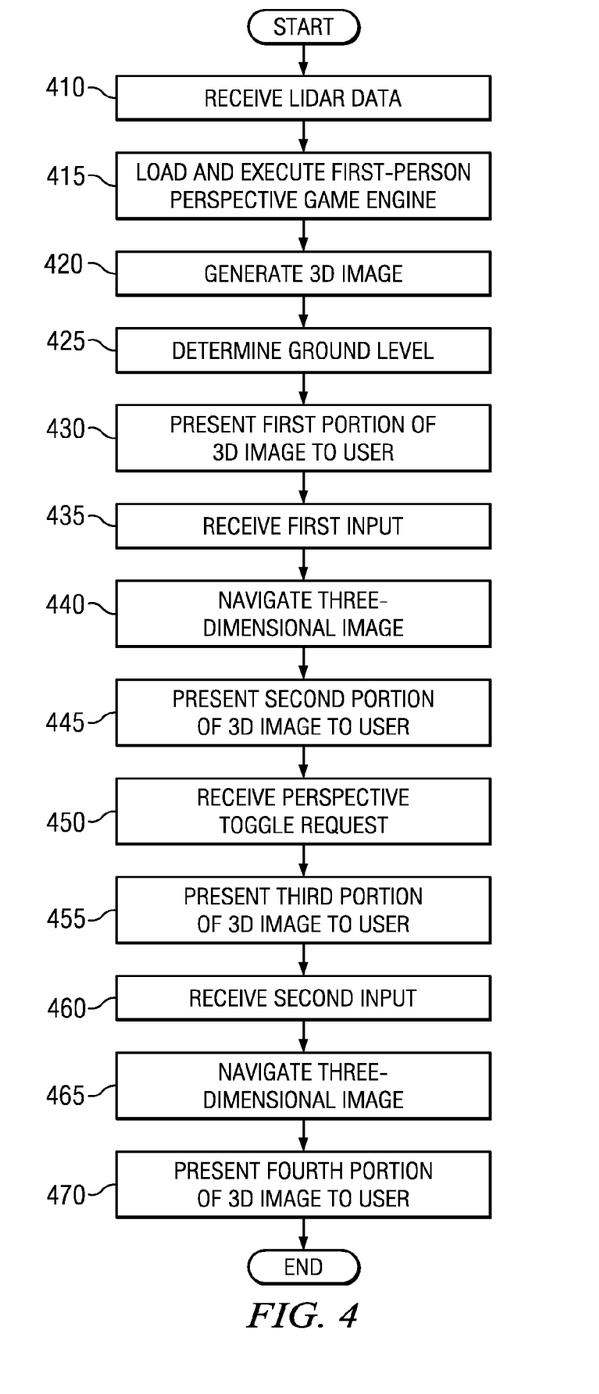
FIG. 4 illustrates a method for visualizing LIDAR data, in accordance with a particular embodiment.

FIG. 4 illustrates a method for visualizing LIDAR data, in accordance with a particular embodiment. In certain embodiments, the method of FIG. 4 may be performed by a computer, such as computer 210 of FIG. 2. The method begins at step 410 with the receipt of LIDAR data. The LIDAR data may be generated by any of a plurality of different types of LIDAR systems such as laser-based LIDAR systems. The LIDAR data may be generated based on detecting light pulses that have reflected off various objects, including the ground. These reflections may be detected and associated with a position within a three-dimensional space. In essence, the LIDAR data may comprise a plurality of 3D pixels, sometime referred to as voxels. The reflections may be processed to create a 3D image with which a user may then interact. The 3D image may correspond to a particular geographic area, including any objects therein. In certain embodiments, the LIDAR data may be collected from a LIDAR system scanning the geographic area from an airplane. The airplane's speed, orientation, and direction of flight may be used along with timing information (e.g., a time from when the pulse is generated and when a reflection is detected) to correlate the received reflections with their corresponding position within the 3D space.

At step 415 a first person perspective game engine is loaded and executed. For example, the first person perspective game engine may be one used for first person shooting games (e.g., Doom, Halo, Crysis, Unreal, etc.). The game engine may present the 3D image and/or LIDAR data from a walking perspective. The game engine may also allow a user to move a camera around the LIDAR data. In certain embodiments, the camera movement may simulate the movement of a user walking over the actual terrain of the geographic area. For example, as the user moves the camera through a valley in the 3D image, the elevation of the camera may drop, matching the contour of the valley. In some embodiments, the game engine may also allow the camera to quickly and intuitively change its orientation (e.g., where the camera is facing).

At step 420 a 3D image is generated. The 3D image may be generated based on the LIDAR data received at step 410. In certain embodiments, the 3D image may be generated in accordance with parameters or constraints associated with the game engine that is loaded and executed at step 415. In some embodiments, a separate program may be loaded and executed by the computer to generate the 3D image. For example, JMonkey may be used to generate the 3D image from the LIDAR data. Depending on the embodiment, the 3D image may comprise a plurality of dots, a plurality of triangles, a plurality of polygons, a plurality of platelets, or any other geometric shape or combination of geometric shapes that may be used to represent individual data points (e.g., detected reflections). In some embodiments, a computer may attempt to generate or simulate surfaces for identified objects within the 3D image based on the LIDAR data. This may provide solid appearing shapes based on where individual reflections, or clusters of reflections, are located within the 3D space.

At step 425 the ground level is determined. In certain embodiments, the ground level may be determined based on where there is the greatest collection, or clustering, of reflections. In some embodiments, the ground is determined to be the lowest clustering of reflections. The ground level may not be a flat surface, rather the ground level may correspond to the contours of the terrain of the geographic area being represented by the 3D image.

At step 430 a first portion of a 3D image is presented to the user. The first portion may correspond to the portion of the 3D image within a camera's field of view. For example, if the camera is positioned at a southern edge of the 3D image and is looking north, then the portion of the 3D image presented to the user would correspond to a cone of vision generated from the camera and extending north. The camera may be positioned at a constant height above the ground level corresponding to a height of the user. In some embodiments, the user may adjust the height at which the camera is positioned within the 3D image. In certain embodiments, the portion of the 3D image that is presented to the user may only include those portions of the 3D image for which there is a clear line-of-sight from the camera. For example, if there is a lake in front of the camera, the lake may not be presented to the user if it is hidden by a hill. This may correspond to the fact that if a user were to stand in the corresponding location within the geographic area, the user would not be able to see the lake that is blocked by the hill.

At step 435 a first input is received. The input may correspond to a request by the user to change a portion of the 3D image that is displayed. This may include a request to change the location of the camera (e.g., to walk somewhere), change the direction the camera is facing (e.g., look around), or a combination of the two. The request may be received from any of a variety of different input devices including, but not limited to, a mouse and keyboard, a gamepad, a stylus, a touch screen, audible commands, or any other device or combination of devices.

At step 440 the 3D image is navigated. Because the 3D image is presented in the walking perspective, navigating the 3D image may comprise having the camera walk along the ground level as determined at step 425. As the camera walks along the ground level, the 3D image presented the user may change. Furthermore, depending on the contours of the ground level, the camera elevation may change as the ground level's elevation changes underneath the moving camera. In some scenarios, the camera may walk up to an object that rises from the ground level (e.g., a building). Depending on the configuration of the computer and the available data, the user may be allowed to walk underneath the building, or they may be prevented from walking through the building. In some embodiments, as the camera is walking along the ground level, the user may enter additional inputs, such as moving a mouse to look around. This may allow the user to explore the 3D image as though he were exploring the actual corresponding geographic area.

At step 445 a second portion of the 3D image is presented to the user. The second portion presented may reflect a change in location or a change in orientation of the camera from the first portion of the 3D image presented at step 430. In certain embodiments, steps 440 and 445 may be continuously repeated as the user walks around the 3D image looking at various objects. This may allow the user to identify or discover objects that might not be discoverable or noticed from a traditional overhead view. In addition, by being able to walk along the ground level, the user may be able to determine or gain additional insight that may not be determinable by using a traditional viewing program that allows the user to simply pan and zoom around the image.

At step 450 a perspective toggle request is received. The perspective toggle request may be a request to change from the walking perspective to a pan and zoom perspective. This may move the camera from just above the ground level to an overhead location (e.g., a bird's eye view). In some embodiments, toggling between the two perspectives may return the camera to its last location within the respective perspective. For example, if a user switches from a pan and zoom perspective to a walking perspective and then walks some distance, when the user toggles back to the pan and zoom perspective the camera may return to its location just before the user first toggled to the walking perspective. In some embodiments the cameras location may remain relatively consistent between toggles. For example, toggling the perspective from a walking perspective to a pan and zoom perspective may change the control scheme without immediately changing the portion of the 3D image that is viewed. In particular embodiments, each time the user toggles the perspective, the camera may return to a default location for that perspective.

At step 455 a third portion of the 3D image is presented to the user. This third portion may correspond to the change in perspective triggered by the toggle request received at step 450. In particular embodiments, upon receiving the toggle request, the computer may jump directly between perspective views. In some embodiments, the computer may visually transition between perspective views (e.g., show the camera moving between perspectives).

At step 460 a second input is received. The second input may be a pan or zoom input which may adjust or change the image displayed for the user. The input may be received from a mouse and/or keyboard or any other appropriate input device.

In certain embodiments, the same physical buttons or control surfaces for both the first input at step 435 and the second input at step 460 may result in different changes to the view that is presented because of the different perspectives selected. For example, pressing the up key on a keyboard in the walking perspective may cause the camera to walk forward along the ground, while in the pan and zoom perspective pushing the up key on a keyboard may cause the camera to increase its elevation. As another example, in the walking perspective each movement of the mouse may correspond to a direct movement of the field-of-view of the camera without requiring the user to press any buttons. Whereas, in the pan and zoom perspective, moving the mouse may move a curser on the screen without affecting the image displayed. It is not until the user clicks and drags that the perspective actually changes in a pan and zoom perspective.

At step 465 a 3D image is navigated based on the input received at step 460. For example, if a zoom input is received at step 460, then the navigation may zoom the 3D image accordingly.

At step 470 a fourth portion of the 3D image is presented to the user. The fourth portion of the 3D image may correspond to the input received at step 460 and the navigation conducted at step 465. In certain embodiments, the navigation done at step 465 may use a different rendering component or engine than what is used for navigating the walking perspective at step 440. In some embodiments, the game engine may be used to navigate in both the walking perspective and the pan and zoom perspective.

While the embodiment depicted in FIG. 4 includes a certain number of steps, depicted in a certain order, it is to be understood that other embodiments may have more, fewer or different steps, and the steps may be rearranged or performed simultaneously. For example, in some embodiments, a computer may generate the 3D image before loading the game engine. As another example, in some embodiments the walking perspective may be implemented without loading a game engine. As another example, in certain situations, the user may begin in the pan and zoom perspective, and then toggle to the walking perspective. As yet another example, in some embodiments, two different computers (or two different processors or processor cores within the same computer) may be used by two or more users to separately navigate the 3D image in parallel.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2 or FIG. 4, according to operational needs or desires. Furthermore, the elements of computer 210 and various LIDAR systems may be combined, rearranged or positioned in order to accommodate particular scanning or visualization needs. In addition, any of these elements may be provided as separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims.

What is claimed:

1. A method comprising:
receiving light detection and ranging (LIDAR) data comprising a plurality of data points created from reflections from a LIDAR system, the plurality of data points arranged within a three-dimensional space associated with a geographic area; receiving a selection of a first perspective for presenting a three-dimensional image; generating the three-dimensional image of the geographic area based on the plurality of data points of the LIDAR data arranged within a three-dimensional space and the selection of the first perspective for presenting the three-dimensional image; presenting at least a first portion of the three-dimensional image to a user based on the selection of the first perspective and a viewing area of a camera arranged to correspond to the user positioned at a first location in the geographic area, the first portion of the three-dimensional image presented from the selection of the first perspective; navigating the three-dimensional image based on a first input received from the user, the first input directing the camera to move along a path in the selection of the first perspective to simulate movement of the user in the geographic area based on the first input and the three-dimensional image; and
presenting at least a second portion of the three-dimensional image to the user based on the selection of a second perspective and navigating the camera to a second location in the geographic area, the second portion of the three dimensional image presented from the selection of the second perspective to simulate movement of the user to the second location in the geographic area as seen from the second perspective.

2. The method of claim 1, further comprising
receiving a perspective toggle request from a user requesting the three-dimensional image be presented from a pan and zoom perspective for the second perspective.

3. The method of claim 2, further comprising:
presenting at least a third portion of the three dimensional image to a user based on a camera at a third location in the geographic area, the third portion of the three-dimensional image presented from the pan and zoom perspective;
navigating the three-dimensional image based on a second input received from the user, the second input directing the camera to move to a fourth location in the geographic area based on the second input to simulate movement of the user to the fourth location in the geographic area, the camera moving in the pan and zoom perspective in a relatively straight line from the third location to the fourth location; and presenting at least a fourth portion of the three-dimensional image to the user based on navigating the camera to the fourth location to simulate movement of the user to the fourth location in the geographic area, the fourth portion of the three dimensional image presented from the pan and zoom perspective.

4. The method of claim 3, wherein the first input is based on a first control scheme associated with a first input device and the second input is based on a second control scheme associated with the first input device.

5. The method of claim 1:
further comprising determining a ground level of the three-dimensional image, the ground level corresponding to a terrain of the geographic area when the selection of the first perspective is a walking perspective; and
wherein navigating the three-dimensional image based on an input received from the user comprises directing the camera to move along a path in the walking perspective that follows the terrain based on the first input and the three-dimensional image to simulate movement of the user along the path.

6. The method of claim 1, further comprising loading and executing a first-person perspective game engine configured to facilitate in generating the three-dimensional image, presenting the first and second portions of the three-dimensional image, and navigating the three-dimensional image.

7. The method of claim 1, wherein navigating the three-dimensional image based on a first input received from the user comprises navigating the three-dimensional image based on a first input received from a gamepad operated by the user.

8. A system comprising:
an interface configured to receive light detection and ranging (LIDAR) data comprising a plurality of data points created from reflections from a LIDAR system, the plurality of data points arranged within a three-dimensional space associated with a geographic area and to receive a selection of a first perspective for presenting a three-dimensional image; and
a processor coupled to the interface and configured to:
generate the three-dimensional image of the geographic area based on the plurality of data points of the LIDAR data arranged within a three-dimensional space and the selection of the first perspective for presenting the three-dimensional image;
present at least a first portion of the three-dimensional image to a user based on the selection of the first perspective and a viewing area of a camera arranged to correspond to the user positioned at a first location in the geographic area, the first portion of the three-dimensional image presented from the selection of the first perspective; navigate the three-dimensional image based on a first input received from the user the first input directing the camera to move along a path in the selection of the first perspective to simulate movement of the user in the geographic area based on the first input and the three-dimensional image; and
present at least a second portion of the three-dimensional image to the user based on the selection of a second perspective and navigating the camera to a second location in the geographic area, the second portion of the three dimensional image presented from the selection of the second perspective to simulate movement of the user to the second location in the geographic area as seen from the second perspective.

9. The system of claim 8, wherein the interface further configured to receive a perspective toggle request from a user requesting the three-dimensional image be presented from a pan and zoom perspective for the second perspective.

10. The system of claim 9, wherein the processor is further configured to:
present at least a third portion of the three-dimensional image to a user based on a camera at a third location in the geographic area, the third portion of the three-dimensional image presented from the pan and zoom perspective;
navigate the three-dimensional image based on a second input received from the user, the second input directing the camera to move to a fourth location in the geographic area based on the second input to simulate movement of the user to the fourth location in the geographic area, the camera moving in the pan and zoom perspective in a relatively straight line from the third location to the fourth location; and
present at least a fourth portion of the three-dimensional image to the user based on navigating the camera to the fourth location to simulate movement of the user to the fourth location in the geographic area, the fourth portion of the three dimensional image presented from the pan and zoom perspective.

11. The system of claim 10, wherein the first input is based on a first control scheme associated with a first input device and the second input is based on a second control scheme associated with the first input device.

12. The system of claim 8, wherein:
the processor is further configured to determine a ground level of the three-dimensional image, the ground level corresponding to a terrain of the geographic area when the selection of the first perspective is a walking perspective; and
the processor configured to navigate the three-dimensional image based on an input received from the user is further configured to direct the camera to move along a path in the walking perspective that follows the terrain based on the first input and the three-dimensional image to simulate movement of the user along the path.

13. The system of claim 8, wherein the processor is further configured to load and execute a first-person perspective game engine configured to facilitate in generating the three-dimensional image, presenting the first and second portions of the three-dimensional image, and navigating the three-dimensional image.

14. The system of claim 8, wherein the processor configured to navigate the three-dimensional image based on a first input received from the user is further configured to navigate the three-dimensional image based on a first input received from a gamepad operated by the user.

15. A non-transitory computer readable medium comprising instructions that, when executed by a processor, cause the machine to:
receive light detection and ranging (LIDAR) data comprising a plurality of data points created from reflections from a LIDAR system, the plurality of data points arranged within a three-dimensional space associated with a geographic area; receiving a selection of a first perspective for presenting a three-dimensional image;
generate the three-dimensional image of the geographic area based on the plurality of data points of the LIDAR data arranged within a three-dimensional space and the selection of the perspective for presenting the three-dimensional image;
present at least a first portion of the three-dimensional image to a user based on the selection of the first perspective and a viewing area of a camera arranged to correspond to the user positioned at a first location in the geographic area, the first portion of the three-dimensional image presented from the selection of the first perspective;
navigate the three-dimensional image based on a first input received from the user, the first input directing the camera to move along a path in the selection of the first perspective to simulate movement of the user in the geographic area based on the first input and the three-dimensional image; and
present at least a second portion of the three-dimensional image to the user based on the selection of a second perspective and navigating the camera to a second location in the geographic area, the second portion of the three dimensional image presented from the selection of the second perspective to simulate movement of the user to the second location in the geographic area as seen from the second perspective.

16. The computer readable medium of claim 15, further configured to receive a perspective toggle request from a user requesting the three-dimensional image be presented from a pan and zoom perspective for the second perspective.

17. The computer readable medium of claim 16, further configured to:
present at least a third portion of the three-dimensional image to a user based on a camera at a third location in the geographic area, the third portion of the three-dimensional image presented from the pan and zoom perspective;
navigate the three-dimensional image based on a second input received from the user, the second input directing the camera to move to a fourth location in the geographic area based on the second input to simulate movement of the user to the fourth location in the geographic area, the camera moving in the pan and zoom perspective in a relatively straight line from the third location to the fourth location; and
present at least a fourth portion of the three-dimensional image to the user based on navigating the camera to the fourth location to simulate movement of the user to the fourth location in the geographic area, the fourth portion of the three dimensional image presented from the pan and zoom perspective.

18. The Computer readable of claim 17, wherein the first input is based on a first control scheme associated with a first input device and the second input is based on a second control scheme associated with the first input device.

19. The computer readable of claim 15:
further configured to determine a ground-level of the three-dimensional image, the ground level corresponding to a terrain of the geographic area when the selection of the first perspective is a walking perspective; and
wherein the logic configured to navigate the three-dimensional image based on an input received from the user is further configured to direct the camera to move along a path in the walking perspective that follows the terrain based on the first input and the three-dimensional image to simulate movement of the user along the path.

20. The computer readable medium of claim 15, further configured to load and execute a first-person perspective game engine configured dimensional to facilitate in image, presenting generating the three the first and second portions of the three-dimensional image, and navigating the three-dimensional image.

21. The computer readable medium of claim 15, wherein the logic configured to navigate the three-dimensional image based on a first input received from the user is further configured to navigate the three-dimensional image based on a first input received from a gamepad operated by the user.

* * * * *